US009861961B2

(12) United States Patent
Umeno et al.

(10) Patent No.: US 9,861,961 B2
(45) Date of Patent: Jan. 9, 2018

(54) CATALYST FOR NITROGEN OXIDE REMOVAL

(71) Applicant: UMICORE SHOKUBAI JAPAN CO., LTD., Tokoname-shi, Aichi (JP)

(72) Inventors: Takahiro Umeno, Tokoname (JP); Masaya Hanzawa, Tokoname (JP); Yoshiyuki Hayashi, Tokoname (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 0 days.

(21) Appl. No.: 14/903,152

(22) PCT Filed: Jul. 8, 2014

(86) PCT No.: PCT/JP2014/068189
§ 371 (c)(1),
(2) Date: Jan. 6, 2016

(87) PCT Pub. No.: WO2015/005342
PCT Pub. Date: Jan. 15, 2015

(65) Prior Publication Data
US 2016/0184803 A1 Jun. 30, 2016

(30) Foreign Application Priority Data

Jul. 8, 2013 (JP) ................................. 2013-143029

(51) Int. Cl.
*B01J 23/10* (2006.01)
*B01J 23/40* (2006.01)
(Continued)

(52) U.S. Cl.
CPC .......... *B01J 23/63* (2013.01); *B01D 53/9418* (2013.01); *B01D 53/9422* (2013.01);
(Continued)

(58) Field of Classification Search
CPC ... B01J 23/10; B01J 23/40; B01J 23/42; B01J 23/44; B01J 23/46; B01J 23/63; B01J 21/04
(Continued)

(56) References Cited

U.S. PATENT DOCUMENTS 5,597,771 A * 1/1997 Hu ........................ B01D 53/945
502/303
6,413,483 B1 * 7/2002 Brisley .............. B01D 53/9422
423/213.2

(Continued)

FOREIGN PATENT DOCUMENTS

CN 101842157 A 9/2010
EP 1 541 220 A1 6/2005
(Continued)

OTHER PUBLICATIONS

Office Action dated Dec. 6, 2016, by The State Intellectual Property Office of People's Republic of China in corresponding Chinese Patent Application No. 201480039365.3 with an English translation of the Office Action (14 pages).

(Continued)

*Primary Examiner* — Cam N. Nguyen
(74) *Attorney, Agent, or Firm* — Buchanan Ingersoll & Rooney PC

(57) ABSTRACT

An exhaust gas purification method by which carbon monoxide (CO), hydrocarbon (HC), and nitrogen oxide (NOx), particularly NOx, which are hazardous components contained in an exhaust gas can be removed efficiently. The disclosure relates to a catalyst for exhaust gas purification including: a three-dimensional structure; and a catalyst component layer composed of one or more constituting layers on the three-dimensional structure, wherein the catalyst component layer contains (a) a noble metal-unsupported alumina having mesopores, (b) NOx storage material-sup- (Continued)

ported cerium, (c) a refractory inorganic oxide, and (d) a noble metal, and the constituting layer of the uppermost surface among the one or more constituting layers contains (a) the noble metal-unsupported alumina and (b) the NOx storage material-supported cerium, a method for producing the same, and an exhaust gas purification method using the catalyst.

9 Claims, 2 Drawing Sheets

(51) Int. Cl.
| | |
|---|---|
| *B01J 23/42* | (2006.01) |
| *B01J 23/44* | (2006.01) |
| *B01J 23/46* | (2006.01) |
| *B01J 23/63* | (2006.01) |
| *B01J 21/04* | (2006.01) |
| *B01D 53/94* | (2006.01) |
| *B01J 37/02* | (2006.01) |
| *B01J 35/00* | (2006.01) |
| *B01J 35/04* | (2006.01) |
| *B01J 37/04* | (2006.01) |
| *B01J 37/08* | (2006.01) |
| *B01J 35/10* | (2006.01) |

(52) U.S. Cl.
CPC .......... *B01J 35/0006* (2013.01); *B01J 35/04* (2013.01); *B01J 37/0236* (2013.01); *B01J 37/0244* (2013.01); *B01J 37/0248* (2013.01); *B01J 37/04* (2013.01); *B01J 37/08* (2013.01); *B01D 53/945* (2013.01); *B01D 2255/1021* (2013.01); *B01D 2255/1023* (2013.01); *B01D 2255/1025* (2013.01); *B01D 2255/204* (2013.01); *B01D 2255/2042* (2013.01); *B01D 2255/2065* (2013.01); *B01D 2255/2092* (2013.01); *B01D 2255/9025* (2013.01); *B01D 2255/91* (2013.01); *B01D 2255/92* (2013.01); *B01J 35/1019* (2013.01); *B01J 35/1047* (2013.01); *B01J 35/1061* (2013.01); *B01J 37/0203* (2013.01); *B01J 2523/00* (2013.01); *Y02T 10/22* (2013.01)

(58) Field of Classification Search
USPC ....... 502/304, 326, 327, 332–334, 339, 355, 502/439, 527.12, 527.13
See application file for complete search history.

(56) References Cited

U.S. PATENT DOCUMENTS

| | | | | |
|---|---|---|---|---|
| 6,677,272 | B2* | 1/2004 | Beall | B01D 53/02 501/118 |
| 6,764,665 | B2* | 7/2004 | Deeba | B01D 53/865 423/213.5 |
| 6,777,370 | B2* | 8/2004 | Chen | B01D 53/945 502/241 |
| 7,517,510 | B2* | 4/2009 | Chen | B01D 53/945 422/168 |
| 7,550,124 | B2* | 6/2009 | Chen | B01D 53/945 422/168 |
| 7,758,834 | B2* | 7/2010 | Chen | B01D 53/945 423/213.2 |
| 7,795,172 | B2* | 9/2010 | Foong | B01D 53/945 502/302 |
| 8,568,675 | B2* | 10/2013 | Deeba | B01D 53/945 422/177 |
| 8,592,337 | B2* | 11/2013 | Hilgendorff | B01D 53/9422 423/263 |
| 8,617,496 | B2* | 12/2013 | Wei | B01J 23/63 423/213.2 |
| 8,722,001 | B2* | 5/2014 | Ono | B01D 53/945 423/213.5 |
| 8,734,743 | B2* | 5/2014 | Muller-Stach | B01D 53/945 422/170 |
| 8,784,759 | B2* | 7/2014 | Hilgendorff | F01N 3/0814 422/170 |
| 9,034,269 | B2* | 5/2015 | Hilgendorff | B01J 37/0244 422/170 |
| 9,114,385 | B2* | 8/2015 | Brisley | B01D 53/9422 |
| 9,440,192 | B2* | 9/2016 | Hoke | B01D 53/945 |
| 9,540,980 | B2* | 1/2017 | Hilgendorff | B01D 53/9422 |
| 2003/0175192 | A1* | 9/2003 | Hu | B01D 53/8637 423/239.1 |
| 2003/0180197 | A1 | 9/2003 | Nunan | |
| 2003/0185736 | A1 | 10/2003 | Hatanaka et al. | |
| 2005/0129588 | A1 | 6/2005 | Nunan | |
| 2007/0219089 | A1 | 9/2007 | Goto | |
| 2008/0044330 | A1* | 2/2008 | Chen | B01D 53/945 423/213.5 |
| 2010/0215557 | A1* | 8/2010 | Liu | B01D 53/945 423/213.5 |
| 2010/0260652 | A1 | 10/2010 | Nakane et al. | |
| 2012/0055141 | A1* | 3/2012 | Hilgendorff | B01J 23/58 60/301 |
| 2014/0171302 | A1* | 6/2014 | Jung | B01J 23/63 502/304 |

FOREIGN PATENT DOCUMENTS

| | | |
|---|---|---|
| EP | 2 335 811 A1 | 6/2011 |
| JP | 10-501737 A | 2/1996 |
| JP | 9-500570 A | 1/1997 |
| JP | 2000 024517 A | 1/2000 |
| JP | 2001-123827 A | 5/2001 |
| JP | 2001-170500 A | 6/2001 |
| JP | 2001-248471 A | 9/2001 |
| JP | 2002-276337 A | 9/2002 |
| JP | 2005-262071 A | 9/2005 |
| JP | 2006-326437 A | 12/2006 |
| JP | 2007-275878 A | 10/2007 |
| WO | WO 95/35152 A1 | 12/1995 |
| WO | WO 2010/041741 A1 | 4/2010 |

OTHER PUBLICATIONS

Notification Concerning Transmittal of International Preliminary Report on Patentability (Forms PCT/IB/326 and PCT/IB/373), Notification of Transmittal of Translation of the International Preliminary Report on Patentability (Form PCT/IB/338), and the Written Opinion of the International Searching Authority (Form PCT/ISA/237) dated Jan. 21, 2016, by the International Bureau of WIPO, in corresponding International Application No. PCT/JP2014/068189. (16 pages).
Extended European Search Report dated Apr. 3, 2017, by the European Patent Office in corresponding European Application No. 14823794.4 (11 pages).
International Search Report (PCT/ISA/210) dated Oct. 21, 2014, by the Japanese Patent Office as the International Searching Authority for International Application No. PCT/JP2014/068189.
Written Opinion (PCT/ISA/237) dated Oct. 21, 2014, by the Japanese Patent Office as the International Searching Authority for International Application No. PCT/JP2014/068189.
The Second Office Action issued by the State Intellectual Property Office of the People's Republic of China, on Aug. 1, 2017 in corresponding Chinese Patent Application No. 201480039365.3 and an English Translation of the Office Action (8 pages).

* cited by examiner

CATALYST FOR NITROGEN OXIDE REMOVAL

TECHNICAL FIELD

The present invention relates to a catalyst for nitrogen oxide removal. Particularly, the present invention relates to a catalyst for exhaust gas purification aiming at removing particularly nitrogen oxide (NOx) among hazardous components contained in an exhaust gas from an internal combustion engine such as a gasoline engine or a diesel engine, and an exhaust gas purification method using the catalyst.

BACKGROUND ART

NOx in atmosphere causes photochemical smog or acid rain. Therefore, emission of NOx from, for example, an automobile equipped with an internal combustion engine, which is one of NOx generation sources, has become a social problem. For this reason, investigation has been progressed in a direction of making a law and regulations on the emission amount of NOx severer in the future. However, since a diesel engine or a gasoline lean-burn engine performs lean combustion in which a large amount of oxygen exists, reduction and removal of NOx is difficult.

For this reason, various catalysts for NOx purification have been conventionally proposed. For example, a NOx storing treatment method is mentioned which is represented by a method of storing nitrogen oxide, then introducing hydrocarbon (HC) that is a reducing substance by engine control, and removing the nitrogen oxide (Patent Literature 1). Further, as a technique of compensating for drawbacks in the storage and removal of NOx, a method is mentioned in which a catalyst oxidizing HC and CO is disposed at the upstream side of the flow of an exhaust gas and a catalyst for NOx purification is disposed at the downstream side (Patent Literature 2). In addition, there is also a method aiming at effectively utilizing $H_2$ contained in an exhaust gas, in which HC and CO are selectively purified at the upstream side and NOx is reduced at the downstream side by using the remaining $H_2$. Furthermore, a technique is proposed in which a reducing agent such as ammonia is actively introduced into an exhaust gas so that NOx is reduced and removed (Patent Literature 3).

CITATION LIST

Patent Literatures

Patent Literature 1: JP 2001-248471 A
Patent Literature 2: JP 2001-123827 A
Patent Literature 3: JP 2006-326437 A

SUMMARY OF INVENTION

Regarding the removal of nitrogen oxide that has been a problem in the exhaust gas purification in the past, it is demanded that purification can be performed efficiently even in a high-temperature region in which a temperature of the exhaust gas is higher than 500° C. and also even in a relatively low-temperature region of about 250° C. Not only in the case of a low rotation number of the engine, but also in the case of a high space velocity (high SV) with respect to a catalyst for exhaust gas purification in which the rotation number is high and a large amount of exhaust gas is emitted, efficient removal of nitrogen oxide is demanded. An object of the present invention is to solve the problems described above.

The above-described problems are solved by the following means.

Specifically, a catalyst for exhaust gas purification according to the present invention includes: a three-dimensional structure; and a catalyst component layer composed of one or more constituting layers on the three-dimensional structure, wherein the catalyst component layer contains (a) a noble metal-unsupported alumina having mesopores (hereinafter, also referred to as "(a) a noble metal-unsupported alumina"), (b) NOx storage material-supported cerium, (c) a refractory inorganic oxide, and (d) a noble metal, and the constituting layer of the uppermost surface among the one or more constituting layers contains (a) the noble metal-unsupported alumina and (b) the NOx storage material-supported cerium.

DESCRIPTION OF EMBODIMENTS

Figure 1:
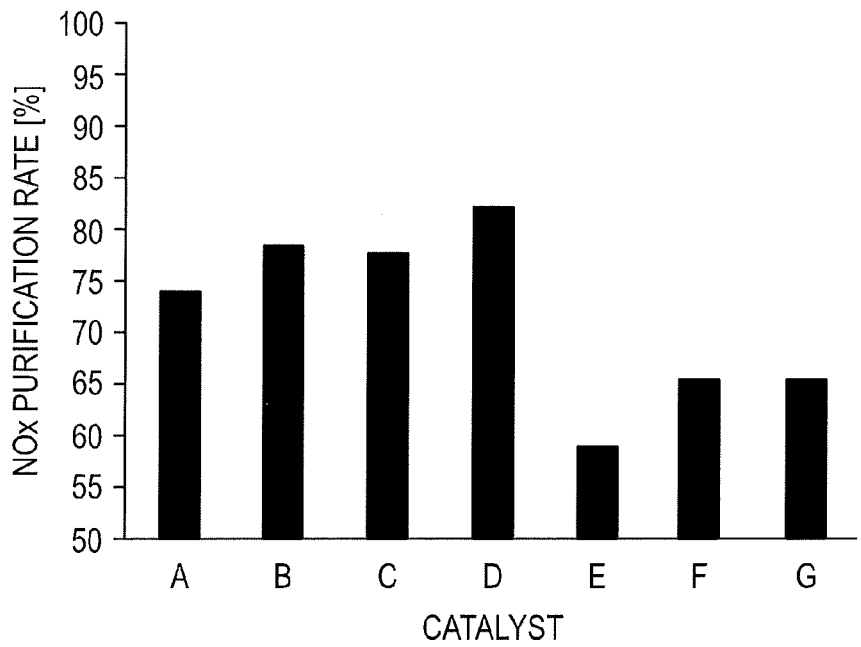
FIG. 1 is a graph showing an average NOx purification rate (%) of each of completed catalysts according to the present invention when steady state evaluation is performed in a high-temperature region in which a catalyst inlet temperature is about 500° C.

A first invention of the present invention relates to a catalyst for exhaust gas purification including:
a three-dimensional structure; and
a catalyst component layer composed of one or more constituting layers on the three-dimensional structure, wherein
the catalyst component layer contains (a) a noble metal-unsupported alumina having mesopores (hereinafter, also referred to as "(a) a noble metal-unsupported alumina"), (b) NOx storage material-supported cerium, (c) a refractory inorganic oxide, and (d) a noble metal, and
the constituting layer of the uppermost surface among the one or more constituting layers contains (a) the noble metal-unsupported alumina and (b) the NOx storage material-supported cerium.

A second invention of the present invention relates to a method for producing the catalyst described above, and a third invention relates to an exhaust gas treatment method using the catalyst described above.

Next, the present invention will be described in detail for each constituent element.

<Catalyst for Exhaust Gas Purification>

The catalyst for exhaust gas purification of the present invention has, on a three-dimensional structure serving as a carrier, a catalyst component layer containing (a) a noble metal-unsupported alumina having mesopores, (b) NOx storage material-supported cerium, (c) a refractory inorganic oxide, and (d) a noble metal as catalyst components. The catalyst component layer is composed of one or more constituting layers and a constituting layer other than the layer of the uppermost surface may contain at least any one of (a) to (d) catalyst components, but the constituting layer of the uppermost surface contains at least (a) the noble metal-unsupported alumina and (b) the NOx storage material-supported cerium. Furthermore, the entire catalyst component layer contains all of (a) to (d) catalyst components.

When the catalyst of the present invention is used, particularly NOx among CO, HC, and NOx which are hazardous components contained in an exhaust gas can be removed efficiently. In particular, NOx which is a hazardous component contained in an exhaust gas can be reduced and removed efficiently even in a high-temperature region of 500° C. or higher and also even in a high SV region.

Mechanism for obtaining such an effect is not clear, but it is considered as follows. The pore volume of (a) the noble metal-unsupported alumina has an effect of efficiently adsorbing some of a reducing agent such as hydrocarbon (HC) onto the alumina surface. NOx can be removed efficiently by the reaction of the adsorbed HC with NOx. At this time, when a noble metal is supported on the alumina, oxidation reaction of HC occurs rapidly, and thus NOx cannot be removed due to HC—NOx reaction. For this reason, (a) the noble metal-unsupported alumina is used as the alumina.

In (b) the NOx storage material-supported cerium, electrons on cerium are strongly attracted to the oxygen side by the electron donating action of an element having a high basicity such as strontium and the electron-attracting property of oxygen itself, and thus the bonding between cerium and oxygen becomes stronger and cerium is difficult to release oxygen in a reducing atmosphere. For this reason, NOx reduction reaction can occur rapidly without the combustion of HC adsorbed onto (a) the noble metal-unsupported alumina. Since the reaction mainly occurs on the surface of a catalyst layer in a high-temperature region, particularly, in a high SV region, if (a) the noble metal-unsupported alumina and the NOx storage material-supported cerium are introduced into the surface layer, HC—NOx reaction occurs rapidly and thus NOx can be removed.

Therefore, it is considered that, in particular, when (a) the noble metal-unsupported alumina and (b) the NOx storage material-supported cerium are contained in the constituting layer of the uppermost surface among the constituting layers constituting the catalyst component layer, NOx can be reduced and removed efficiently in a high-temperature region and a high SV region. Accordingly, one or more constituting layers are more preferably at least two layers. However, the above-described mechanism is a speculative theory and does not limit the present invention.

(Three-Dimensional Structure)

The three-dimensional structure plays a role as a catalyst carrier supporting a catalyst component layer. As the three-dimensional structure, a monolith carrier is preferable. As the monolith carrier, materials generally called ceramic honeycomb carriers may be used, particularly, honeycomb carriers which contain cordierite, mullite, α-alumina, zirconia, titania, titanium phosphate, aluminum titanate, petalite, spodumene, aluminosilicate, magnesium silicate, and the like as materials are preferable, and among them, a honeycomb carrier made of cordierite is particularly preferable. Other than the above, a honeycomb carrier obtained by forming a refractory three-dimensional structure using a heat-resistant metal with oxidization resistance such as stainless steel or a Fe—Cr—Al alloy is also used.

These monolith carriers are produced by an extrusion molding method, a method of solidly winding a sheet-form element, or the like. A shape of a gas vent (cell form) may be any of a hexagon, a square, a triangle, and a corrugation form. The cell density (the number of cells/unit cross sectional area) of 100 to 600 cells/square inch is sufficiently usable, and the cell density is preferably 200 to 500 cells/square inch.

(Catalyst Component; (a) Noble Metal-Unsupported Alumina)

(a) The noble metal-unsupported alumina is one substantially not containing a noble metal having mesopores. Substantially, it means one that is on a level in which the noble metal does not exhibit a specific effect thereof. For example, in a case where the noble metal-unsupported alumina contains Pt, Pt is contained in an amount of 0.0005% by mass or less; in a case where the noble metal-unsupported alumina contains Pd, Pd is contained in an amount of 0.0005% by mass or less; and in a case where the noble metal-unsupported alumina contains Rh, Rh is contained in an amount of 0.0005% by mass or less. When (a) the noble metal-unsupported alumina is used, the heat resistance of the catalyst layer can be improved and the catalyst component layer can be prevented from being peeled off from the three-dimensional structure. In addition, when (a) the noble metal-unsupported alumina has mesopores, a reducing agent can be adsorbed strongly and thus NOx removal efficiency is further improved.

The alumina is not particularly limited as long as it has mesopores, and any alumina may be used. Examples thereof include α-alumina, γ-alumina, δ-alumina, η-alumina, and θ-alumina. These kinds of alumina may be used alone or in combination of two or more thereof.

In addition, regarding the alumina, from the viewpoint of improving heat resistance of the catalyst, a heat-resistant alumina is also preferably used. Such a heat-resistant alumina has a specific surface area of 100 $m^2$/g or more and preferably 120 to 350 $m^2$/g, and has a reduced decrease in the specific surface area even when exposed to heat of about 700° C.

(a) The noble metal-unsupported alumina is a powder having an average particle diameter of generally 2.0 to 60 μm, preferably 5.0 to 50 μm, and more preferably 5.0 to 40 μm.

The used amount of the noble metal-unsupported alumina is not particularly limited, but is preferably 5 to 150 g per liter (L) of the catalyst (hereinafter, described as g/L), and more preferably 10 to 100 g/L. When (a) the noble metal-unsupported alumina is 5 g/L or more, (a) the noble metal-unsupported alumina achieves a desired effect and thus can exert the performance thereof sufficiently. On the other hand, when the used amount is 150 g/L or less, it is possible to avoid that a carrier is difficult to be covered with a slurry at the time of preparing a catalyst, which is favorable.

An alumina having mesopores is used as (a) the noble metal-unsupported alumina. The mesopore means a pore having an average pore diameter of 2 to 50 nm, preferably 2 to 30 nm, and more preferably 5 to 25 nm. As the mesopore of (a) the noble metal-unsupported alumina, a mesopore having a pore volume of 0.7 to 1.2 ml/g is preferable, and when the pore volume is within such a range, a reducing agent can be adsorbed strongly and thus the removal efficiency of NOx is improved. The pore volume of (a) the noble metal-unsupported alumina is more preferably 0.8 to 1.15 ml/g. The specific surface area of (a) the noble metal-unsupported alumina is preferably 350 $m^2$/g or less, and particularly preferably 120 to 310 $m^2$/g. The noble metal-unsupported alumina is a powder having an average particle diameter of 2.0 to 50 µm, preferably 5.0 to 50 µm, and more preferably 5.0 to 40 µm.

When (a) the noble metal-unsupported alumina is used, the effect of the present invention can be exhibited. Preferably, when (a) the noble metal-unsupported alumina is present in the surface layer of the catalyst, that is, the constituting layer of the uppermost surface among one or more constituting layers constituting the catalyst component layer, the effect of the present invention can be further yielded.

(Catalyst Component; (b) NOx Storage Material-Supported Cerium)

(b) The NOx storage material-supported cerium is obtained by supporting a NOx storage material on cerium. As the NOx storage material, an oxide of an element having a high basicity can be used, but an oxide of an alkali metal and/or alkaline-earth metal is preferable, and barium oxide or strontium oxide is more preferable. As the cerium, cerium in an oxide state can be used.

(b) The NOx storage material-supported cerium can be formed by supporting a NOx storage material on cerium oxide, and can also be formed in a mixture obtained by mixing a NOx storage material source and a cerium source, or in a solid solution in which both or one of the NOx storage material source and the cerium source is solid-soluted in crystals of both or the other thereof. (b) The NOx storage material-supported cerium can be obtained by mixing respective solid raw materials and heating the mixture (solid-phase reaction method), and can also be obtained by mixing aqueous liquids of respective raw materials and drying and calcining the mixture (liquid layer reaction method). When one of raw materials is a solid and the other is an aqueous liquid, the NOx storage material-supported cerium can also be obtained by impregnating the solid with the liquid, followed by being dried and solid-calcined (impregnation method).

When (b) the NOx storage material-supported cerium is present particularly in the uppermost layer of the catalyst, that is, the constituting layer of the uppermost surface among the constituting layers constituting the catalyst component layer, a desired effect of the present invention can be exhibited.

The used amount of (b) the NOx storage material-supported cerium is not particularly limited. Specifically, (b) the NOx storage material-supported cerium is used in an amount of preferably 3 to 200 g, more preferably 3 to 100 g per liter (L) of the catalyst (hereinafter, described as g/L), and most preferably 10 to 100 g. Here, when the used amount (supported amount) of (b) the NOx storage material-supported cerium is 3 g/L or more, (b) the NOx storage material-supported cerium can exert the performance thereof sufficiently, and when the used amount is 200 g/L or less, a decrease in mechanical strength of the catalyst component layer can be avoided, which is favorable. (b) The NOx storage material-supported cerium is generally a powder, and the size of the average particle diameter is not particularly limited.

Regarding (b) the NOx storage material-supported cerium, a ratio of the cerium oxide to the NOx storage material at this time is preferably 0.5 to 5.0 and most preferably 1.0 to 5.0 in terms of weight ratio ($CeO_2$-reduced mass/NOx storage material mass). When the weight ratio is 5.0 or less, the NOx storage material can be dispersed sufficiently on the cerium oxide, which is favorable. On the other hand, when the weight ratio is 0.5 or more, the NOx storage material can exert the performance thereof sufficiently, which is favorable.

(a) The noble metal-unsupported alumina having mesopores and (b) the NOx storage material-supported cerium described above are contained in the constituting layer of the uppermost surface among one or more constituting layers constituting the catalyst component layer. In the constituting layer of the uppermost surface, a catalyst component other than (a) the noble metal-unsupported alumina and (b) the NOx storage material-supported cerium may be contained. Furthermore, a total amount of the catalyst components in the constituting layer of the uppermost surface is preferably 30 to 350 g, and more preferably 50 to 300 g per liter of the catalyst. When the total amount of the catalyst components is 30 to 350 g, the catalyst of the present invention can exert a sufficient function of the catalyst components and realize a desired effect.

(Catalyst Component; (c) Refractory Inorganic Oxide)

The refractory inorganic oxide is used for supporting a noble metal. The refractory inorganic oxide is not particularly limited as long as it is any one which may be generally used for a catalyst for an internal combustion engine. Examples thereof include a single oxide such as α-alumina, γ-alumina, δ-alumina, η-alumina, θ-alumina, titania, zirconia, or silicon oxide (silica), and a composite oxide thereof such as alumina-titania, alumina-zirconia, titania-zirconia, zeolite, or silica-alumina. Preferably, a single oxide such as γ-alumina, silica, titania, or zirconia and a composite oxide thereof are used. The above-described refractory inorganic oxide may be used alone or may be used as a mixture form of two or more kinds thereof.

These refractory inorganic oxides are powders having an average particle diameter of generally 2.0 to 60 µm, preferably 5.0 to 50 µm, and more preferably 5.0 to 40 µm.

The used amount (supported amount) of the refractory inorganic oxide is not particularly limited, but is preferably 10 to 450 g, more preferably 50 to 400 g, and still more preferably 100 to 200 g per liter (L) of the catalyst. When the used amount is 10 or more, the catalyst component (for example, the noble metal-unsupported alumina or a noble metal to be specifically described later) can be dispersed sufficiently and durability becomes sufficient. On the other hand, when the used amount is 450 g or less, an effect corresponding to the addition of the refractory inorganic oxide is recognized and an effect of another catalytic active component (for example, a noble metal to be specifically described later) can be exerted sufficiently. As a result, a decrease in activity, an increase in pressure loss, or a decrease in mechanical strength of the catalyst layer can be prevented.

As the alumina, aluminas which have different actions, physical properties, and functions of the present invention can be used. One example of aluminas is a heat-resistant alumina used for improving heat resistance of the catalyst. Such a heat-resistant alumina has a specific surface area of 100 $m^2/g$ or more and preferably 120 to 350 $m^2/g$, and has a reduced decrease in the specific surface area even when the alumina is exposed to heat of about 700° C.

In addition to the above, an alumina having mesopores can also be used for supporting a noble metal. The mesopore means a pore having an average pore diameter of 2 to 50 nm and preferably 2 to 30 nm. The pore volume thereof is 0.7 to 1.2 ml/g and preferably 0.8 to 1.15 ml/g. In particular, when the alumina is used in a state where a noble metal is not supported thereon, the relevant alumina becomes (a) the noble metal-unsupported alumina.

(Catalyst Component; (d) Noble Metal)

As a noble metal used in the present invention, platinum, palladium, rhodium, iridium, ruthenium, or the like is exemplified, but platinum, palladium, rhodium, or iridium is preferable and platinum, palladium, or rhodium is more preferable. The noble metals may be used alone or in combination of a plurality of kinds thereof.

Regarding the used amount of the noble metal, in a case where the noble metal is platinum, the used amount thereof is 0.1 to 15 g per liter of the catalyst (hereinafter, described as g/L) and preferably 0.5 to 10 g, in a case where the noble metal is palladium, the used amount thereof is 0.05 to 10 g and preferably 0.1 to 5.0 g, and in a case where the noble metal is rhodium, the used amount thereof is 0.1 to 5.0 gg and preferably 0.1 to 2.0 g.

The noble metal is supported on the refractory inorganic oxide and then used. At this time, the noble metal may be supported on the same refractory inorganic oxide or can also be supported on a plurality of different refractory inorganic oxides. As a supporting method, it is possible to use a method in which a refractory inorganic oxide and an aqueous liquid of a noble metal are mixed, followed by being dried and calcined; a method in which after a refractory inorganic oxide and an aqueous liquid of a noble metal are mixed, a reducing agent is added thereto so as to reduce a noble metal source, thereby attaching the noble metal to the refractory inorganic oxide; or a method in which after a refractory inorganic oxide and an aqueous liquid of a noble metal are mixed, the mixture is heated so as to adsorb the noble metal onto the refractory inorganic oxide.

(Promoter)

In the present invention, a promoter can be added and used in the catalyst component layer, in addition to the catalyst components described above. As the promoter, an oxide of at least one element selected from the group consisting of an alkali metal, an alkaline-earth metal, a rare-earth element, and magnesium can be used. Examples of an alkali metal oxide include an oxide of sodium, potassium, rubidium, or cesium, examples of an alkaline-earth metal oxide include an oxide of strontium or barium, and examples of a rare-earth element oxide include an oxide of a rare-earth element selected from the group consisting of cerium, lanthanum, praseodymium, neodymium, samarium, europium, gadolinium, terbium, dysprosium, holmium, and erbium. These may be used alone or may be used as a mixture form of two or more kinds thereof. Among them, an oxide of an alkali metal, alkaline-earth metal, or rare-earth element is preferable. Sodium oxide, potassium oxide, barium oxide, strontium oxide, cerium oxide, and lanthanum oxide are more preferable, and potassium oxide, barium oxide, strontium oxide, and cerium oxide are particularly preferable. Incidentally, among the combinations described above, an oxide used in the NOx storage material-supported cerium is excluded.

The promoter component is contained in an amount of 5 to 450 g, more preferably 5 to 400 g, still more preferably 10 to 300 g, and most preferably 20 to 100 g per liter (L) of the catalyst.

In the catalyst of the present invention, when a promoter, for example, an alkaline-earth metal is further used with the noble metal-unsupported alumina simultaneously, the removal efficiency of NOx can be improved particularly in a high-temperature region and a high SV region. In particular, even when the temperature of the exhaust gas is low, for example, in a low-temperature region around 250° C. in which a space velocity generally is also not high, the promoter acts effectively. Furthermore, the promoter component is preferably contained in a constituting layer other than the constituting layer of the uppermost surface. When the promoter is present in a constituting layer at the inner side among the constituting layers of the catalyst component layer, that is, in the first constituting layer in a case where the number of constituting layers is two, the effect of the catalyst of the present invention can be further improved.

<Method for Producing Catalyst for Exhaust Gas Purification>

Hereinafter, a preferred method for producing a catalyst for exhaust gas purification will be described, but the method is not limited to the following method as long as it exhibits the effect of the present invention. The producing method described below is suitable for a case where the catalyst component layer is composed of two or more constituting layers, particularly. Therefore, an embodiment of the present invention also provides a method for producing a catalyst for exhaust gas purification.

An embodiment of the present invention is a method for producing a catalyst for exhaust gas purification, including:

a step of obtaining a first slurry by mixing a first catalyst component and subjecting the resultant mixture to wet milling;

a step of forming a first constituting layer on a three-dimensional structure by immersing the three-dimensional structure into the first slurry, followed by being dried and calcined;

a step of obtaining a second slurry by mixing a second catalyst component and subjecting the resultant mixture to wet milling; and a step of forming a second constituting layer on the first constituting layer by immersing the three-dimensional structure into the second slurry, followed by being dried and calcined to obtain a catalyst component layer.

(Step of Obtaining First Slurry)

In a case where a constituting layer constituting the catalyst component layer is composed of two layers, the first constituting layer becomes an inner layer. In this step, as the inner layer, a catalyst component covering the three-dimensional structure is mixed and the resultant mixture is subjected to wet milling to thereby obtain the first slurry. The methods of mixing and wet milling are not particularly limited, but any method can be used. For example, after at least one kind of (a) the noble metal-unsupported alumina, (b) the NOx storage material-supported cerium, (c) the refractory inorganic oxide, and a water-soluble salt of (d) the noble metal, and a promoter component, which may be used as necessary, are mixed in a solvent, a slurry is obtained by using a wet milling machine such as a ball mill, and thus the first slurry can be obtained.

In the above-described method, a solvent used for preparing the first slurry is not particularly limited, but one used in the relevant technical field can be appropriately employed. At this time, the concentration of the catalyst component in the solvent is not particularly limited as long as it is such an amount that a desired amount can be supported on the three-dimensional structure. Preferably, it is such an amount that the concentration of the catalyst component in the solvent is 20 to 60% by mass, and more preferably 25 to 50% by mass.

The catalytic active component contained in the first constituting layer (inner layer) of the catalyst of the present invention is not particularly limited as long as it contains at least one of (a) the noble metal-unsupported alumina, (b) the NOx storage material-supported cerium, (c) the refractory inorganic oxide, and a water-soluble salt of (d) the noble metal, and the entire catalyst component layer contains (a)

the noble metal-unsupported alumina, (b) the NOx storage material-supported cerium, (c) the refractory inorganic oxide, and a water-soluble salt of (d) the noble metal. However, if necessary, a refractory inorganic oxide, an oxide of at least one element selected from the group consisting of an alkali metal, an alkaline-earth metal, and a rare-earth element, another oxide, and a noble metal can be contained. The used amount (supported amount) of the catalytic active component in the inner layer is not particularly limited, but is preferably 50 to 450 g and still more preferably 70 to 400 g per liter (L) of the catalyst.

(Step of Forming First Constituting Layer)

In this step, the three-dimensional structure is immersed into the first slurry prepared as described above, excessive first slurry is removed as necessary, and drying and calcining are performed so as to form the first constituting layer on the three-dimensional structure. The methods of immersing, drying, and calcining are not particularly limited as long as the first constituting layer can be formed. For example, in drying after the three-dimensional structure is immersed into the first slurry, excessive slurry is blown off by compressed air and drying can be performed at 70 to 280° C. and more preferably at 100 to 200° C. for 1 to 30 minutes and more preferably for 5 to 25 minutes until there is no moisture reduction amount. In calcining, for example, calcination can be performed in an electric furnace at 300 to 800° C. and more preferably at 400 to 600° C. for 15 minutes to 3 hours and more preferably for 30 minutes to 90 minutes.

(Step of Obtaining Second Slurry)

In a case where a constituting layer constituting the catalyst component layer is composed of two layers, the second constituting layer covers the first constituting layer (inner layer) and becomes an outer layer. In this case, the second constituting layer is the constituting layer of the uppermost surface and is also an outermost layer. In this step, a catalyst component contained in the second constituting layer is mixed and the resultant mixture is subjected to wet milling to thereby obtain the second slurry. The methods of mixing and wet milling are not particularly limited, but any method can be used. For example, in a case where the catalyst component layer is composed of only two constituting layers, since the second slurry forms the constituting layer of the uppermost surface, (a) the noble metal-unsupported alumina and (b) the NOx storage material-supported cerium are introduced as essential components into a solvent. Further, as necessary, (c) the refractory inorganic oxide, a water-soluble salt of (d) the noble metal, and the promoter component may be added concurrently in the solvent. After these materials are introduced into the solvent, a slurry is obtained by using a wet milling machine such as a ball mill, and thus the second slurry can be obtained.

As a solvent used for obtaining the second slurry, the same solvent as the solvent used for obtaining the first slurry can be used.

A catalytic active component contained in the second constituting layer (outer layer) of the catalyst of the present invention, that is, the second slurry is not particularly limited as long as it contains (a) the noble metal-unsupported alumina and (b) the NOx storage material-supported cerium and the entire catalyst component layer contains (a) the noble metal-unsupported alumina, (b) the NOx storage material-supported cerium, (c) the refractory inorganic oxide, and a water-soluble salt of (d) the noble metal. However, if necessary, a refractory inorganic oxide, an oxide of at least one element selected from the group consisting of an alkali metal, an alkaline-earth metal, and a rare-earth element, another oxide, and a noble metal can be contained in the second constituting layer. The used amount (supported amount) of the catalytic active component in the second constituting layer (outer layer) is not particularly limited, but is preferably 30 to 350 g and more preferably 50 to 350 g per liter (L) of the catalyst. When the catalyst component supported amount in the second constituting layer is within such a range, the catalyst component exerts a sufficient function and a desired effect can be realized.

(Step of Forming Second Constituting Layer)

In this step, the three-dimensional structure having the first constituting layer formed thereon is immersed in the second slurry prepared as described above, excessive second slurry is removed as necessary, and drying and calcining are performed so as to form the second constituting layer on the first constituting layer. The methods of immersing, drying, and calcining are not particularly limited as long as the second constituting layer can be formed, and the same methods as in the first constituting layer can be used. In a case where the catalyst component layer is composed of two constituting layers, the catalyst of the present invention is completed by forming the second constituting layer.

However, in the catalyst of the present invention, the catalyst component layer may be formed on the three-dimensional structure by only one constituting layer or the catalyst component layer may be formed by two or more constituting layers. Preferably, the catalyst component layer is formed by two constituting layers. When the catalyst component layer composed of two or more constituting layers is provided on the three-dimensional structure, different catalyst components can be supported for respective constituting layers. According to this, since different functions can be imparted to respective constituting layers, the exhaust gas purification performance of the entire catalyst can be improved.

In a case where the catalyst component layer is composed of only one constituting layer, this constituting layer contains all of catalyst components. Therefore, if the slurry contains all of catalyst components, the catalyst can be completed by performing only the step of obtaining a first slurry and the step of forming a first constituting layer. In a case where the catalyst component layer composed of more than two constituting layers is formed, after the first constituting layer is formed by the above-described method, while a desired catalyst component is further used, operations in the step of forming a first slurry and the step of forming a first constituting layer are repeated to thereby form second or higher constituting layers. Further, the constituting layer that becomes an outermost layer is formed by performing the step of configuring a second slurry and the step of forming a second constituting layer, and thus a completed catalyst can be produced.

<Exhaust Gas Treatment Method>

The present invention also provides an exhaust gas treatment method by which an exhaust gas is treated by using the catalyst for exhaust gas purification of the present invention. The exhaust gas to be a target of the catalyst of the present invention is an exhaust gas from an internal combustion engine such as a diesel engine or a gasoline engine. As described above, the catalyst of the present invention is effective for the removal of NOx in the exhaust gas. In particular, when the exhaust gas repeats an oxidizing atmosphere and a reducing atmosphere, the catalyst of the present invention exerts an excellent effect.

In a case where an exhaust gas is treated by using the catalyst according to the present invention, the space velocity (SV) of the exhaust gas is 10,000 to 300,000 $h^{-1}$ and preferably 10,000 to 200,000 h$^{-1}$. The catalyst of the present invention is also effective for an exhaust gas with such a high space velocity.

The treatment temperature of the exhaust gas may be around 150° C. to 900° C. or higher and preferably 200° C. to 700° C. The catalyst of the present invention exerts the removal effect of NOx from such a low-temperature region to a high-temperature region.

The catalyst for exhaust gas purification of the present invention is installed at a passage of the exhaust gas so that the exhaust gas can be treated, and can be installed under the floor of an automobile from the vicinity of the manifold downstream of an engine. Further, a catalyst having another function can be used concurrently. For example, a catalyst or adsorbing body having a hydrocarbon adsorbing function, a diesel particulate filter, a three-way catalyst, or an oxidation catalyst is mentioned. As preferred combination use conditions, for example, the catalyst for purification of the present invention is installed at the upstream side of the exhaust gas and a hydrocarbon adsorbing agent or a diesel particulate filter is installed at the downstream side, or a three-way catalyst or an oxidation catalyst is installed at the upstream side of the exhaust gas and the catalyst for exhaust gas purification of the present invention is installed at the downstream side of the exhaust gas.

EXAMPLES

The effect of the present invention will be described by means of the following Examples and Comparative Examples. However, the technical scope of the present invention is not limited to only the following Examples.

<Powder Preparation>

Before the preparation of a catalyst, a powder used for preparing a catalyst was obtained by the following procedures.

(Powder A)

500 g of heat-resistant alumina (refractory inorganic oxide) and 333.3 g of rhodium nitrate solution were supported by an impregnation method and then dried at 120° C. for 12 hours. After moisture was completely removed, calcination was performed at 500° C. for 1 hour to thereby obtain a powder A (rhodium powder).

(Powder B)

500 g of heat-resistant alumina (refractory inorganic oxide) and 142.5 g of bisethanolamine platinum solution were supported by an impregnation method and then dried at 120° C. for 12 hours. After moisture was completely removed, calcination was performed at 500° C. for 1 hour to thereby obtain a powder B (platinum powder).

(Powder C)

500 g of heat-resistant alumina (refractory inorganic oxide) and 148.8 g of palladium nitrate solution were supported by an impregnation method and then dried at 120° C. for 12 hours. After moisture was completely removed, calcination was performed at 500° C. for 1 hour to thereby obtain a powder C (palladium powder).

(Powder D)

As the NOx storage material-supported cerium, a strontium-supported cerium powder was prepared. 500 g of cerium oxide, 102.1 g of strontium nitrate, and 276 g of water were supported by an impregnation method and then dried at 120° C. for 12 hours. After moisture was completely removed, calcination was performed at 600° C. for 1 hour to thereby obtain a powder D (strontium-supported cerium powder).

(Powder E)

Separately, 500 g of heat-resistant alumina, 102.1 g of strontium nitrate, and 276 g of water were supported by an impregnation method and then dried at 120° C. for 12 hours. After moisture was completely removed, calcination was performed at 600° C. for 1 hour to thereby obtain a powder E (strontium-supported alumina powder).

(Powder F)

An example of preparing a barium-supported cerium powder as the NOx storage material-supported cerium is described. 500 g of cerium oxide, 164.2 g of barium acetate, and 260 g of water were supported by an impregnation method and then dried at 120° C. for 12 hours. After moisture was completely removed, calcination was performed at 500° C. for 1 hour to thereby obtain a powder F (barium-supported cerium powder).

EXAMPLES

Example 1

(First Constituting Layer)

400 g of powder B, 25 g of powder C, 400 g of powder D, 400 g of cerium oxide, and 50 g of heat-resistant alumina (refractory inorganic oxide) were mixed with 1912.5 g of water to thereby obtain an aqueous slurry A. A commercially available monolithic honeycomb carrier made of cordierite (three-dimensional structure, 400 cells/square inch, diameter: 103 mm, length: 130 mm, volume: 1.083 L (liter)) was immersed into this aqueous slurry A, and the excessive slurry was blown off by compressed air. Then, drying was performed at 150° C. for 10 minutes until there was no moisture reduction amount, and calcination was further performed at 500° C. for 1 hour in an electric furnace to thereby obtain an inner layer coat (A) (first constituting layer).

Furthermore, the supported amount of the catalytic active component in the obtained inner layer coat (A) was 255 g per liter (L) of the catalyst. In addition, the supported amount of the cerium oxide serving as a promoter in the inner layer coat (A) was 80 g/L. Further, the supported amount of the NOx storage material-supported cerium in the inner layer coat was 67 g/L with respect to the catalyst.

(Second Constituting Layer)

Next, 34.2 g of powder A, 140 g of powder B, 50 g of powder C, 120 g of powder D, 100 g of noble metal-unsupported alumina having mesopores (I) (average pore diameter of 11 nm) with a pore volume of 1.13 ml/g and a specific surface area of 300 m$^2$/g, and 100 g of heat-resistant alumina (refractory inorganic oxide) were mixed with 816.3 g of water to thereby obtain an aqueous slurry B. The inner layer coat (A) was immersed into this aqueous slurry B, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (A) having an outer layer coat (B) (second constituting layer, the constituting layer of the uppermost surface).

In this catalyst (A), 2.7 g/L of platinum, 0.6 g/L of palladium, 0.2 g/L of rhodium, and 156 g/L of refractory inorganic oxide were supported with respect to the catalyst, 20.0 g/L of noble metal-unsupported alumina oxide (I) was supported on the outer layer, and 4.0 g/L of strontium was supported on the cerium oxide. Furthermore, the weight ratio of cerium to the NOx storage material (CeO$_2$-reduced mass/NOx storage material mass) was 5. In addition, the supported amount of the NOx storage material-supported cerium (total amount in the inner layer and the outer layer) was 87 g/L with respect to the catalyst. The supported amount of strontium was 17.33 g/L with respect to the catalyst.

Furthermore, the supported amount of the NOx storage material-supported cerium in the outer layer coat (B) was 20 g/L with respect to the catalyst. In addition, the catalyst component supported amount in the outer layer coat (B) was 109 g/L with respect to the catalyst.

Example 2

(First Constituting Layer)

An inner layer coat (A) (first constituting layer) was formed on a carrier in the same manner as in Example 1.

(Second Constituting Layer)

34.2 g of powder A, 140 g of powder B, 50 g of powder C, 120 g of powder D, 100 g of noble metal-unsupported alumina oxide having mesopores (II) (average pore diameter of 17 nm) with a pore volume of 0.82 ml/g and a specific surface area of 150 m$^2$/g, and 100 g of heat-resistant alumina (refractory inorganic oxide) were mixed with 816.3 g of water to thereby obtain an aqueous slurry C. A carrier having the inner layer coat (A) was immersed into this aqueous slurry C, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (B).

In this catalyst (B), 2.7 g/L of platinum, 0.6 g/L of palladium, 0.2 g/L of rhodium, and 156 g/L of refractory inorganic oxide were supported with respect to the catalyst. Furthermore, as an outer layer, 20.0 g/L of noble metal-unsupported alumina oxide (II) and a strontium-supported cerium in which 4.0 g/L of strontium was supported on the cerium oxide were coated. In addition, the weight ratio of cerium to the NOx storage material (CeO$_2$-reduced mass/NOx storage material mass) was 5. Further, the supported amount of the NOx storage material-supported cerium (total amount in the inner layer and the outer layer) was 87 g/L. The supported amount of strontium was 17.33 g/L with respect to the catalyst.

Furthermore, the catalyst component supported amount in the outer layer coat (B) was 109 g/L with respect to the catalyst. The supported amount of the NOx storage material-supported cerium in the outer layer coat (B) was 20 g/L with respect to the catalyst.

Example 3

(First Constituting Layer)

An inner layer coat (A) (first constituting layer) was formed on a carrier in the same manner as in Example 1.

(Second Constituting Layer)

34.2 g of powder A, 140 g of powder B, 50 g of powder C, 120 g of powder D, 100 g of noble metal-unsupported alumina having mesopores (III) (average pore diameter of 21 nm) with a pore volume of 0.99 ml/g and a specific surface area of 200 m$^2$/g, and 100 g of heat-resistant alumina (refractory inorganic oxide) were mixed with 816.3 g of water to thereby obtain an aqueous slurry D. The inner layer coat (A) was immersed into this aqueous slurry D, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (C).

In this catalyst (C), 2.7 g/L of platinum, 0.6 g/L of palladium, 0.2 g/L of rhodium, and 156 g/L of refractory inorganic oxide were supported with respect to the catalyst. Furthermore, as an outer layer, 20.0 g/L of noble metal-unsupported alumina (III) and a strontium-supported cerium in which 4.0 g/L of strontium was supported on the cerium oxide were coated. In addition, the weight ratio of cerium to the NOx storage material (CeO$_2$-reduced mass/NOx storage material mass) was 5. Further, the supported amount of the NOx storage material-supported cerium (total amount in the inner layer and the outer layer) was 87 g/L. The supported amount of strontium was 17.33 g/L with respect to the catalyst.

Furthermore, the catalyst component supported amount in the outer layer coat (B) was 109 g/L with respect to the catalyst. The supported amount of the NOx storage material-supported cerium in the outer layer coat (B) was 20 g/L with respect to the catalyst.

Example 4

(First Constituting Layer)

400 g of powder B, 25 g of powder C, 400 g of powder F, 400 g of cerium oxide, 50 g of heat-resistant alumina (refractory inorganic oxide), and 1912.5 g of water were mixed to thereby obtain an aqueous slurry E. A commercially available monolithic honeycomb carrier made of cordierite (400 cells/square inch, diameter: 103 mm, length: 130 mm, volume: 1.083 L) was immersed into this aqueous slurry E, and the excessive slurry was blown off by compressed air. Then, drying was performed at 150° C. for 10 minutes until there was no moisture reduction amount, and calcination was further performed at 500° C. for 1 hour in an electric furnace to thereby obtain an inner layer coat (B). Furthermore, the supported amount of the catalytic active component in the obtained inner layer coat (B) was 255 g per liter (L) of the catalyst. In addition, the supported amount of the cerium oxide serving as a promoter in the inner layer coat (A) was 80 g/L.

(Second Constituting Layer)

Next, a carrier having the inner layer coat (B) was immersed into the aqueous slurry B prepared in the same manner as in Example 1, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (D).

This catalyst (D) had the same composition as that of the completed catalyst (A), except that strontium in the inner layer was changed to barium. The weight ratio of cerium to the NOx storage material (CeO$_2$-reduced mass/NOx storage material mass) was 5. In addition, the supported amount of the NOx storage material-supported cerium (total amount in the inner layer and the outer layer) was 87 g/L with respect to the catalyst.

Comparative Example 1

(First Constituting Layer)

An inner layer coat (A) (first constituting layer) was formed on a carrier in the same manner as in Example 1.

(Second Constituting Layer)

34.2 g of powder A, 140 g of powder B, 50 g of powder C, 100 g of cerium oxide, 100 g of noble metal-unsupported alumina having mesopores (I) (average pore diameter of 11 nm) with a pore volume of 1.13 ml/g and a specific surface area of 300 m²/g, 120 g of heat-resistant alumina (refractory inorganic oxide), and 816.3 g of water were mixed to thereby obtain an aqueous slurry F. A carrier having the inner layer coat (A) was immersed into this aqueous slurry F, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (E).

In this catalyst (E), 2.7 g/L of platinum, 0.6 g/L of palladium, 0.2 g/L of rhodium, and 160 g/L of refractory inorganic oxide were supported with respect to the catalyst, and 20.0 g/L of noble metal-unsupported alumina (I) was supported on the constituting layer of the uppermost surface. Furthermore, the catalyst component supported amount in the constituting layer of the uppermost surface was 109 g/L with respect to the catalyst.

Comparative Example 2

(First Constituting Layer)
An inner layer coat (A) (first constituting layer) was formed on a carrier in the same manner as in Example 1.
(Second Constituting Layer)
34.2 g of powder A, 140 g of powder B, 50 g of powder C, 120 g of powder D, 100 g of noble metal-unsupported alumina oxide (IV) having no mesopores and having a pore volume of 0.65 ml/g and a specific surface area of 500 m²/g, 100 g of heat-resistant alumina (refractory inorganic oxide), and 816.3 g of water were mixed to thereby obtain an aqueous slurry G. The inner layer coat (A) was immersed into this aqueous slurry G, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (F).

In this catalyst (F), 2.7 g/L of platinum, 0.6 g/L of palladium, and 0.2 g/L of rhodium were supported with respect to the catalyst, and 20.0 g/L of noble metal-unsupported alumina oxide IV was supported on the surface layer and 4.0 g/L of strontium was supported on the cerium oxide. In addition, the weight ratio of cerium to the NOx storage material (CeO₂-reduced mass/NOx storage material mass) was 5. Further, the supported amount of the NOx storage material-supported cerium was 87 g/L with respect to the catalyst. The supported amount of NOx storage material-supported cerium in the outer layer was 20 g/L.

Comparative Example 3

(First Constituting Layer)
An inner layer coat (A) (first constituting layer) was formed on a carrier in the same manner as in Example 1.
(Second Constituting Layer)
34.2 g of powder A, 140 g of powder B, 50 g of powder C, 120 g of powder E, 100 g of noble metal-unsupported alumina having mesopores (I) (average pore diameter of 11 nm) with a pore volume of 1.13 ml/g and a specific surface area of 300 m²/g, 100 g of heat-resistant alumina (refractory inorganic oxide), and 816.3 g of water were mixed to thereby obtain an aqueous slurry H. A carrier having the inner layer coat (A) was immersed into this aqueous slurry H, and the excessive slurry was blown off by compressed air. Then, drying was performed at 150° C. for 20 minutes until there was no moisture reduction amount, and calcination was further performed at 500° C. for 1 hour in an electric furnace to thereby obtain a completed catalyst (G).

In this catalyst (G), 2.7 g/L of platinum, 0.6 g/L of palladium, 0.2 g/L of rhodium, and 176 g/L of refractory inorganic oxide were supported with respect to the catalyst. Furthermore, 20.0 g/L of noble metal-unsupported alumina (I) and 4.0 g/L of a strontium-supported alumina in which strontium was supported on a heat-resistant alumina were supported on the constituting layer of the uppermost surface. In addition, the catalyst component supported amount in the constituting layer of the uppermost surface was 109 g/L with respect to the catalyst.

<Evaluation>
(Evaluation Result of NOx Reduction)
The following tests were performed on the completed catalysts (A) to (D) prepared in Examples 1 to 4 described above and the completed catalysts (E) to (G) prepared in Comparative Examples 1 to 4 described above.

Each of the completed catalysts was mounted on a diesel engine bench at the downstream side of the engine, and the average NOx purification rate (%) was measured while a steady operation in which a fuel is ejected such that atmosphere is changed from an oxidizing atmosphere (lean) to a reducing atmosphere (rich) was repeated. The NOx purification rate was calculated by the following equation.

NOx purification rate (%)={engine outlet NOx (ppm)−catalyst outlet NOx(ppm)}/engine outlet NOx(ppm)×100

FIG. 1 is a graph showing an average NOx purification rate (%) of each of completed catalysts (A) to (G) when steady state evaluation is performed in a high-temperature region in which a catalyst inlet temperature is about 500° C. The completed catalysts (A) to (D) used in Examples 1 to 4 exhibited NOx reduction performance higher than those of the completed catalysts (E) to (G) used in Comparative Examples by about 20 to 40%.

Figure 2:
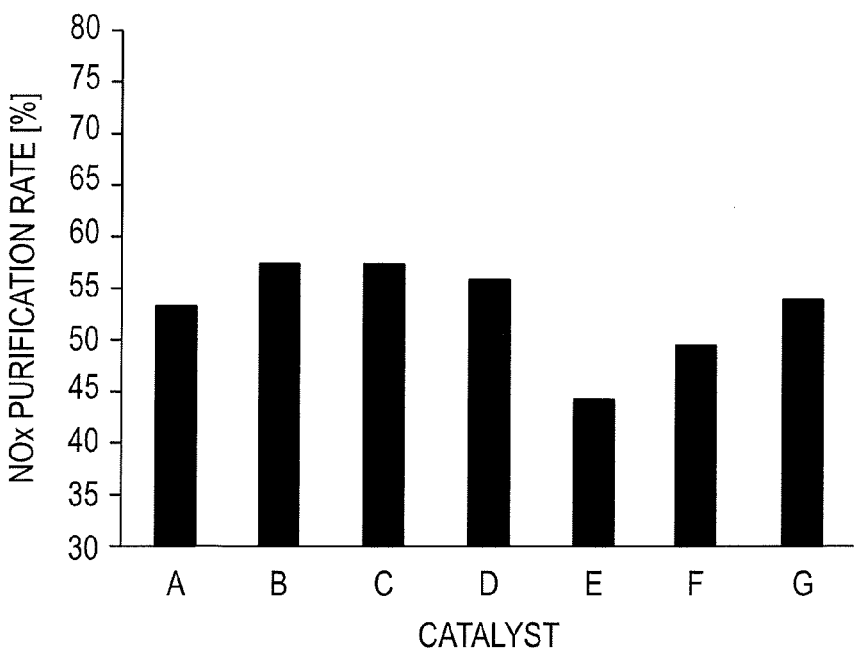
FIG. 2 is a graph showing an average NOx purification rate (%) of each of completed catalysts according to the present invention when steady state evaluation is performed in a high-temperature region in which the catalyst inlet temperature is about 450° C. and a high SV region of about 150,000 $h^{-1}$.

FIG. 2 is a graph showing an average NOx purification rate (%) of each of the completed catalysts (A) to (G) when steady state evaluation is performed in a high-temperature region in which the catalyst inlet temperature is about 450° C. and a high SV region of about 150,000 h⁻¹. The completed catalysts (A) to (D) used in Examples 1 to 4 exhibited NOx reduction performance higher than those of the completed catalysts (E) and (G) not containing strontium in the surface layer by about 20 to 50% and also exhibited NOx reduction performance higher than that of the completed catalyst (F) by about 10%.

Figure 3:
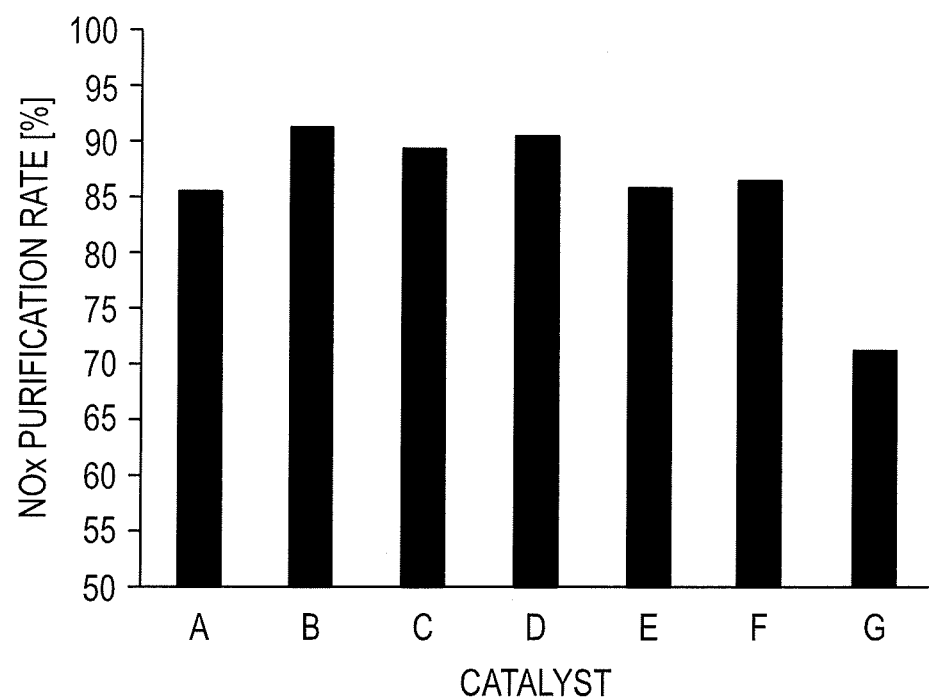
FIG. 3 is a graph showing an average NOx purification rate (%) of each of completed catalysts according to the present invention when steady state evaluation is performed in a low-temperature region in which the catalyst inlet temperature is about 250° C.

FIG. 3 is a graph showing an average NOx purification rate (%) of each of the completed catalysts (A) to (G) when steady state evaluation is performed in a low-temperature region in which the catalyst inlet temperature is about 250° C. The completed catalysts (A) to (D) used in Examples 1 to 4 exhibited NOx reduction performance higher than that of the completed catalyst (G) in which strontium is supported on the alumina oxide by about 20 to 30%.

INDUSTRIAL APPLICABILITY

The present invention can be used in exhaust gas treatment and can be used in automobile exhaust gas treatment since NOx can be reduced even when an exhaust gas has high temperature and high SV.

The invention claimed is:
1. A catalyst for exhaust gas purification comprising:
a three-dimensional structure; and
a catalyst component layer composed of one or more constituting layers on the three-dimensional structure, wherein
the catalyst component layer comprises (a) a noble metal-unsupported alumina, wherein the noble metal-unsup- ported alumina contains mesopores and is substantially free of a noble metal, (b) NOx storage material-supported cerium, (c) a refractory inorganic oxide, and (d) a noble metal, and the constituting layer of the uppermost surface among the one or more constituting layers comprises (a) the noble metal-unsupported alumina and (b) the NOx storage material-supported cerium.

2. The catalyst according to claim 1, wherein the one or more constituting layers are at least two layers.

3. The catalyst according to claim 1, wherein,
(a) the noble metal-unsupported alumina is contained in an amount of 5 to 150 g per liter of the catalyst,
(b) the NOx storage material-supported cerium is contained in an amount of 3 to 200 g per liter of the catalyst,
(c) the refractory inorganic oxide is contained in an amount of 10 to 450 g per liter of the catalyst, and
(d) the noble metal is contained in an amount of 0.1 to 15 g when (d) the noble metal is platinum, in an amount of 0.05 to 10 g when (d) the noble metal is palladium, and in an amount of 0.1 to 5.0 g when (d) the noble metal is rhodium, per liter of the catalyst.

4. The catalyst according to claim 1, wherein a total amount of the catalyst components in the constituting layer of the uppermost surface is 30 to 350 g per liter of the catalyst.

5. The catalyst according to claim 1, wherein a pore volume of mesopores of (a) the noble metal-unsupported alumina is within the range of 0.7 to 1.2 ml/g.

6. The catalyst according to claim 1, wherein a weight ratio of cerium to the NOx storage material in (b) the NOx storage material-supported cerium ($CeO_2$-reduced mass/NOx storage material mass) is 0.5 to 5.0.

7. The catalyst according to claim 1, wherein the catalyst component layer further comprises a promoter.

8. The catalyst according to claim 7, wherein the promoter is contained in a constituting layer other than the constituting layer of the uppermost surface.

9. The catalyst according to claim 1, wherein the NOx storage material comprises an oxide of an alkali metal or strontium oxide.

\* \* \* \* \*